United States Patent
Hase

(10) Patent No.: US 8,734,032 B2
(45) Date of Patent: May 27, 2014

(54) LENS BARREL HAVING SHUTTER FLEXIBLE CIRCUIT BOARD AND IMAGE PICKUP APPARATUS HAVING THE SAME

(71) Applicant: Canon Kabushiki Kaisha, Tokyo (JP)

(72) Inventor: Hiroyuki Hase, Fujisawa (JP)

(73) Assignee: Canon Kabushiki Kaisha (JP)

( * ) Notice: Subject to any disclaimer, the term of this patent is extended or adjusted under 35 U.S.C. 154(b) by 0 days.

(21) Appl. No.: 13/755,495

(22) Filed: Jan. 31, 2013

(65) Prior Publication Data

US 2013/0195438 A1    Aug. 1, 2013

(30) Foreign Application Priority Data

Jan. 31, 2012    (JP) .................................. 2012-018346

(51) Int. Cl.
*G03B 9/08*    (2006.01)
(52) U.S. Cl.
USPC .......................................... 396/462; 396/542
(58) Field of Classification Search
USPC .................................................. 396/462, 542
See application file for complete search history.

(56) References Cited

U.S. PATENT DOCUMENTS

| 4,864,348 | A  | * | 9/1989  | Fujiwara et al. ............. 396/542 |
| 5,051,764 | A  | * | 9/1991  | Nomura ........................ 396/462 |
| 5,559,571 | A  | * | 9/1996  | Miyamoto et al. .............. 396/52 |
| 5,717,969 | A  | * | 2/1998  | Miyamoto et al. ........... 396/535 |
| 6,493,511 | B2 | * | 12/2002 | Sato ................................. 396/72 |
| 6,687,459 | B2 | * | 2/2004  | Nomura et al. .................. 396/72 |
| 2005/0254815 | A1 | * | 11/2005 | Sakamoto ..................... 396/462 |
| 2007/0019950 | A1 | * | 1/2007  | Tanaka .......................... 396/462 |
| 2007/0092246 | A1 | * | 4/2007  | Aoki et al. .................... 396/462 |
| 2013/0195438 | A1 | * | 8/2013  | Hase ............................. 396/529 |

FOREIGN PATENT DOCUMENTS

JP    2008-225430 A    9/2008

* cited by examiner

*Primary Examiner* — William B Perkey
(74) *Attorney, Agent, or Firm* — Rossi, Kimms & McDowell, LLP

(57) ABSTRACT

A lens barrel capable of improving the workability in assembling a shutter flexible circuit board and capable of preventing a force that acts to press the shutter flexible circuit board into inside the lens barrel from being applied to the shutter flexible circuit board at the time of assemblage. The lens barrel has a fixed barrel having a notch portion formed thereon through which a coupling portion of the shutter flexible circuit board is inserted and having a fixed shaft formed thereon to project outward in a diametrical direction and to be fitted into a hole of the coupling portion. The lens barrel has a support member formed with a movement preventing portion that prevents the coupling portion whose hole is fitted with the fixed shaft from moving outward in a diametrical direction of the fixed barrel.

10 Claims, 13 Drawing Sheets

LENS BARREL HAVING SHUTTER FLEXIBLE CIRCUIT BOARD AND IMAGE PICKUP APPARATUS HAVING THE SAME

BACKGROUND OF THE INVENTION

1. Field of the Invention

The present invention relates to a lens barrel having a shutter flexible circuit board, and an image pickup apparatus having the lens barrel.

2. Description of the Related Art

As a lens barrel unit mounted to an image pickup apparatus such as a digital camera, there has been proposed a lens barrel unit that includes a lens barrel supported by a fixed barrel, a shutter flexible circuit board disposed along an outer periphery of a shutter unit provided in the lens barrel, and a lens barrel flexible circuit board disposed on an outer periphery of the fixed barrel, wherein the shutter flexible circuit board has a connection member inserted through a through hole of the fixed barrel and exposed to the outside and then electrically connected to the lens barrel flexible circuit board (Japanese Laid-open Patent Publication No. 2008-225430).

In the proposed lens barrel unit, the connection member of the shutter flexible circuit board is bent immediately after being inserted through the through hole of the fixed barrel and is then connected to the lens barrel flexible circuit board. Accordingly, the lens barrel must be moved forward in order to insert the connection member into the through hole of the fixed barrel, resulting in low workability in assemblage.

Since the connection member is bent immediately after being inserted through the through hole, the connection member is sometimes applied with a force acting to press the connection member into inside the lens barrel. In that case, there is a fear that ghost or flare is caused by reflection of light passing through a photographing optical system by the shutter flexible circuit board pressed into inside the lens barrel, or that wire disconnection is caused by the shutter flexible circuit board being pinched between component parts inside the lens barrel when the lens barrel is brought into a retracted state.

SUMMARY OF THE INVENTION

The present invention provides a lens barrel capable of improving the workability in assembling a shutter flexible circuit board and capable of preventing a force that acts to press the shutter flexible circuit board into inside the lens barrel from being applied to the shutter flexible circuit board at the time of assemblage.

According to one aspect of this invention, there is provided a lens barrel comprising a fixed barrel configured to support first and second lens barrels so as to be movable in an optical axis direction, the second lens barrel having a shutter driving unit, a shutter flexible circuit board having a first connection portion configured to be connected to the shutter driving unit and a second connection portion configured to be connected to the first connection portion through a coupling portion, and a support member configured to support the fixed barrel and a driving unit for driving the first and second lens barrels, wherein the fixed barrel has a notch portion formed thereon through which the coupling portion of the shutter flexible circuit board is inserted, and has a fixed shaft formed thereon to project outward in a diametrical direction and to be fitted into a hole formed in the coupling portion of the shutter flexible circuit board, and the support member has a movement preventing portion formed thereon configured to prevent the coupling portion of the shutter flexible circuit board whose hole is fitted with the fixed shaft of the fixed barrel from moving outward in the diametrical direction of the fixed barrel.

With this invention, it is possible to improve the workability in assembling the shutter flexible circuit board and to prevent a force acting to press the shutter flexible circuit board into inside the lens barrel from being applied to the shutter flexible circuit board at the time of assemblage. It is therefore possible to prevent ghost or flare from being caused by photographing light being reflected by the shutter flexible circuit board and to prevent wire disconnection from being caused by the shutter flexible circuit board being pinched between component parts of the lens barrel when the lens barrel is brought into a retracted state.

Further features of the present invention will become apparent from the following description of an exemplary embodiment with reference to the attached drawings.

DESCRIPTION OF THE EMBODIMENTS

The present invention will now be described in detail below with reference to the drawings showing a preferred embodiment thereof.

Figure 1:
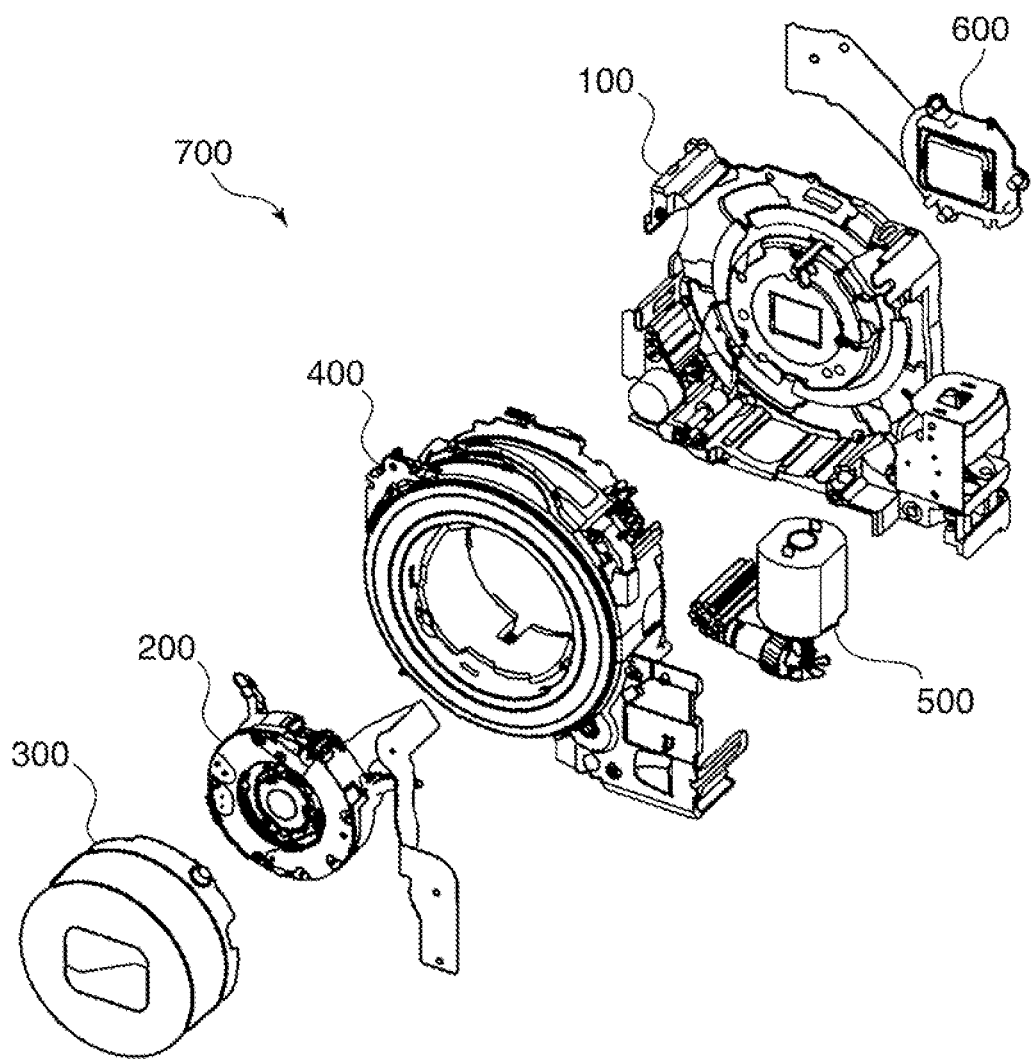
FIG. 1 is an exploded perspective view showing a lens barrel mounted to a digital camera, which is an example of an image pickup apparatus according to one embodiment of this invention.

FIG. 1 shows in exploded perspective view a lens barrel mounted on a digital camera, which is an example of an image pickup apparatus according to one embodiment of this invention.

As shown in FIG. 1, a lens barrel 700 includes a focus unit 100, second group unit 200, first group unit 300, barrel unit 400, zoom reduction gear unit 500, and imaging device unit 600. The first and second group units 300, 200 (which are an example of first and second lens barrels of this invention) are supported by the barrel unit 400 so as to be movable in an optical axis direction. The barrel unit 400, zoom reduction gear unit 500, and imaging device unit 600 are supported by the focus unit 100.

Figure 2:
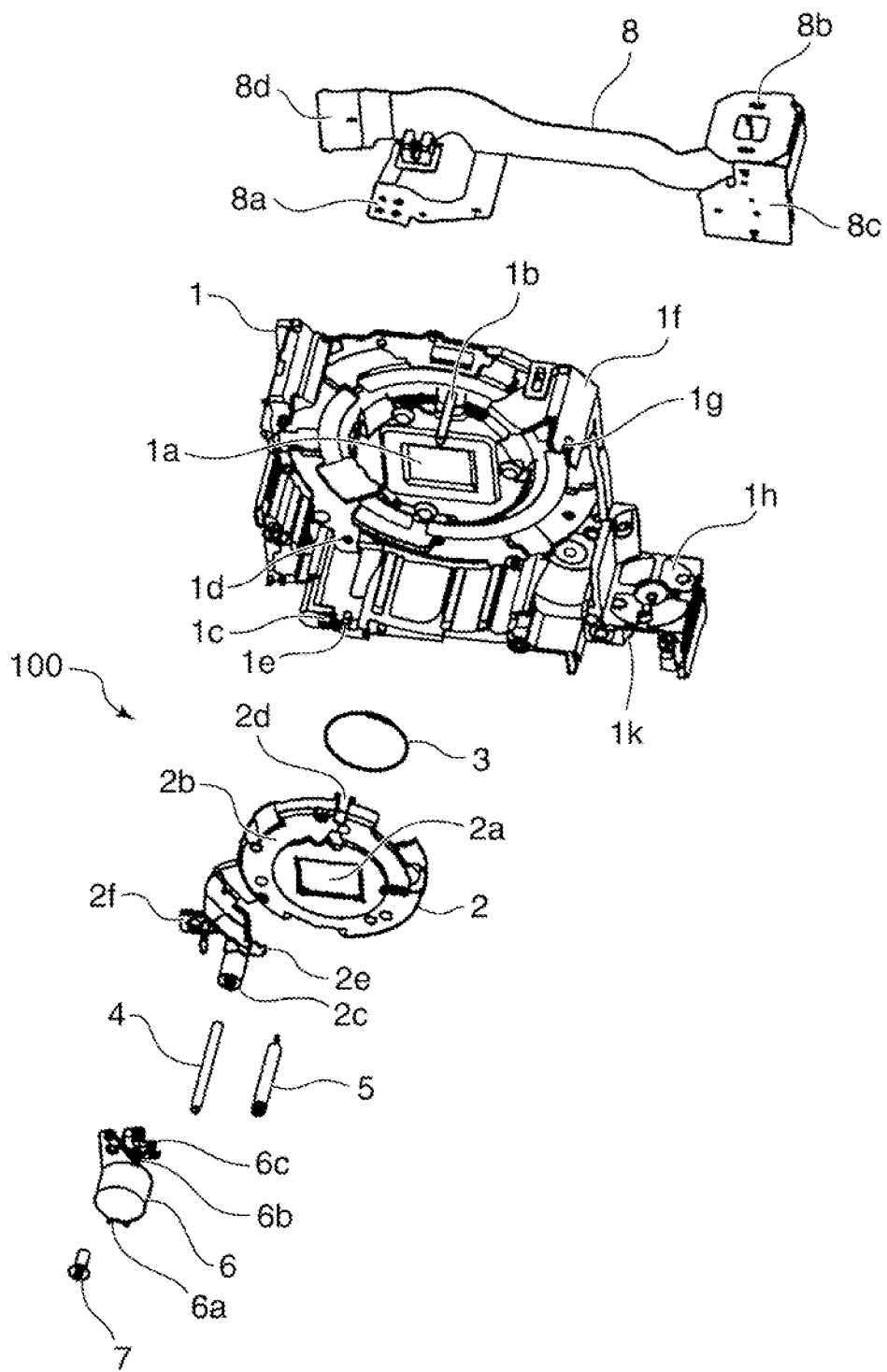
FIG. 2 is an exploded perspective view showing a focus unit of the lens barrel.

FIG. 2 shows the focus unit 100 in exploded perspective view.

As shown in FIG. 2, the focus unit 100 includes a support base plate 1 (which is an example of a support member of this invention), lens holding frame 2, photographing optical system 3, guide shaft 4, spring 5, focus motor 6, and lens barrel flexible circuit board 8.

The support base plate 1 is formed at its central part with an opening 1a through which object light enters. Around the opening 1a, a rotation preventing shaft 1b that prevents the lens holding frame 2 from rotating is formed. Holes 1c, 1d that support the guide shaft 4, and a hook 1e hooked with the spring 5 are also formed around the opening 1a. The holes 1c, 1d are provided so as to face the rotation preventing shaft 1b on a side opposite from the shaft 1b with respect to the opening 1a, and the hook 1e is provided near the hole 1c.

Figure 3:
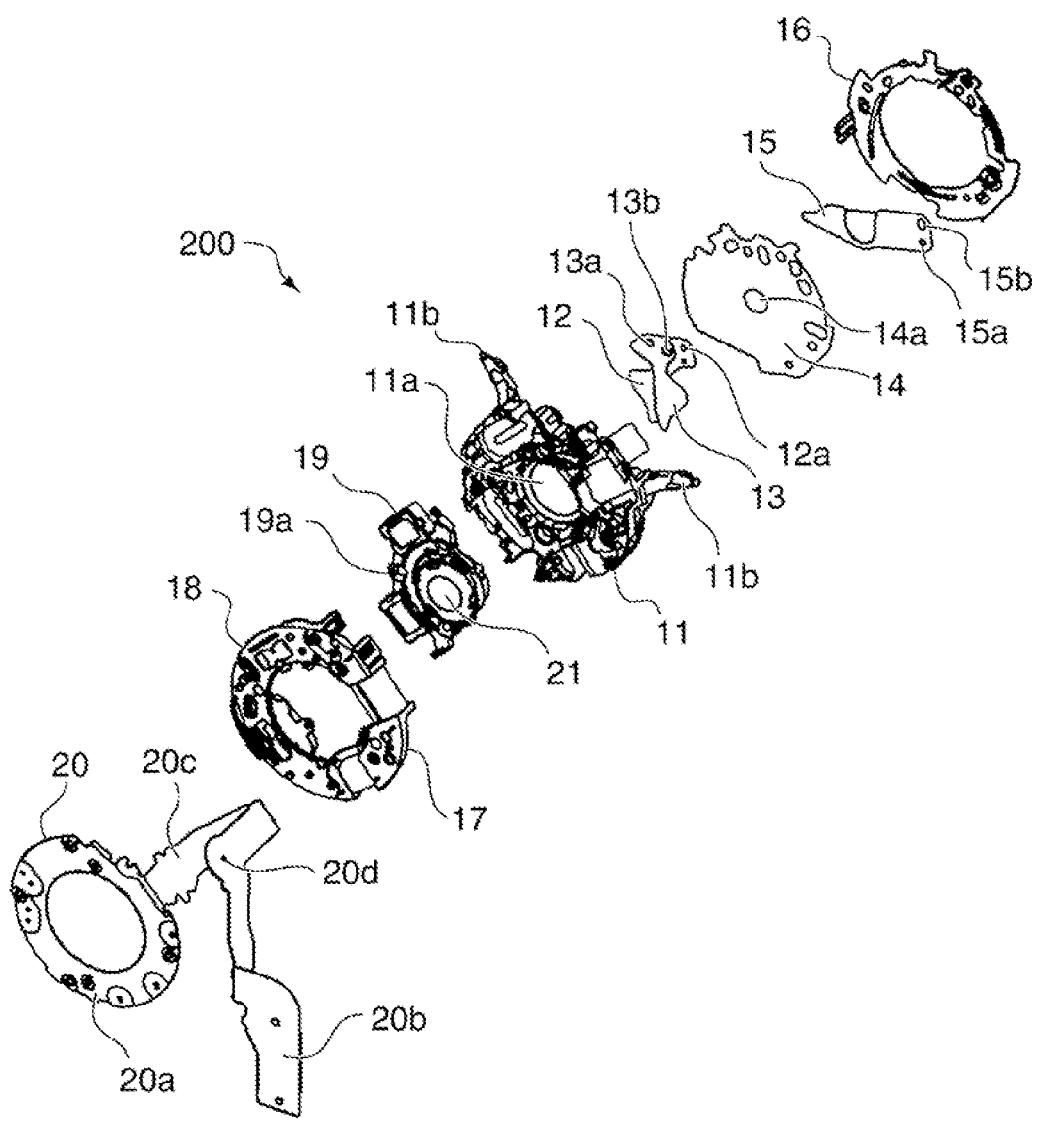
FIG. 3 is an exploded perspective view showing a second group unit of the lens barrel.

A movement preventing portion 1f that prevents a coupling portion 20c of a shutter flexible circuit board 20 shown in FIG. 3 from moving outward in a diametrical direction of the lens barrel 700 is formed around the opening 1a on the support base plate 1. The movement preventing portion 1f is formed at its tip end portion with a U-shaped hole 1g into which a fixed shaft 51g of a fixed barrel 51 (see FIG. 5) is inserted.

Figure 7:
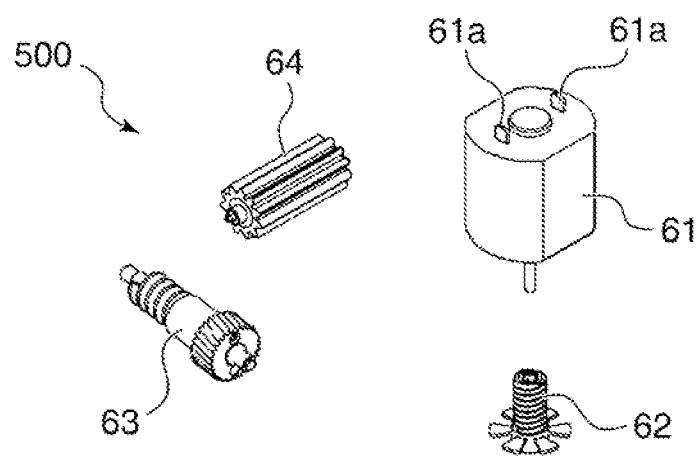
FIG. 7 is an exploded perspective view showing a zoom reduction gear unit of the lens barrel.

The support base plate 1 is formed with a hold portion 1h that holds a zoom motor 61 shown in FIG. 7. Near the hold portion 1h, a support portion 1k is formed that supports reduction gears 63, 64 shown in FIG. 7.

The lens holding frame 2 has a flange portion 2b that holds the photographing optical system 3 for focus adjustment. An opening 2a is formed at a central part of the flange portion 2b, and a bearing hole 2c fitted with the guide shaft 4 is formed in the lens holding frame 2 at a portion outward of the flange portion 2b. The lens holding frame 2 is movable along the guide shaft 4 in the optical axis direction of the photographing optical system 3.

Near the bearing hole 2c, the lens holding frame 2 is formed with a hook 2e hooked with the spring 5, and is formed with an abutment face 2f for contact with a nut 6c of the focus motor 6. The flange portion 2b is formed at its outer periphery with a U-shaped hole 2d into which the rotation preventing shaft 1b of the support base plate 1 is fitted. By the engagement between the rotation preventing shaft 1b and the hole 2d, the lens holding frame 2 is prevented from being rotated.

The guide shaft 4 is disposed parallel to the optical axis of the photographing optical system 3, and has one end thereof fitted into the hole 1c formed in the support base plate 1 on the object side and another end thereof fitted into the hole 1d formed in the support base plate 1 on the image face side. The guide shaft 4 is supported by the support base plate 1, and the lens holding frame 2 is supported by the support base plate 1 through the guide shaft 4.

The spring 5 is disposed near and parallel to the guide shaft 4, and has one end thereof hooked to the hook 1e of the support base plate 1 and another end thereof hooked to the hook 2g of the lens holding frame 2, thereby urging the lens holding frame 2 in a forward direction (i.e., toward the object side).

The focus motor 6 is fixed to the support base plate 1 by a screw 7. The focus motor 6 has a connection terminal 6a electrically connected to a motor connection portion 8a of the lens barrel flexible circuit board 8, and has a screw 6b threadedly engaged with a nut 6c that can be in contact with the abutment face 2f of the lens holding frame 2. By changing a position where the screw 6b and the nut 6c are threadedly engaged with each other, it is possible to move the lens holding frame 2 forward and rearward in the optical axis direction.

The lens barrel flexible circuit board 8 is disposed on the image face side of the support base plate 1. The flexible circuit board 8 has connection portions 8a to 8d respectively connected to the connection terminal 6a of the focus motor 6, to a connection terminal 61a (see FIG. 7) of the zoom motor 61, to a connection portion 20a (see FIG. 3) of the shutter flexible circuit board 20, and to non-illustrated electrical components of a camera main unit. The lens barrel 700 operates according to operation information transmitted from the camera main unit through the connection portion 8d.

FIG. 3 shows the second group unit 200 in exploded perspective view.

As shown in FIG. 3, the second group unit 200 includes a shutter base plate 11 provided at its image face side with shutter blades 12, 13, intermediate sheet 14, ND blade 15, and blade presser 16. The second group unit 200 further includes a shutter and ND driving unit 17, image stabilization driving unit 18, second group lens unit 19, and shutter flexible circuit board 20.

Figure 5:
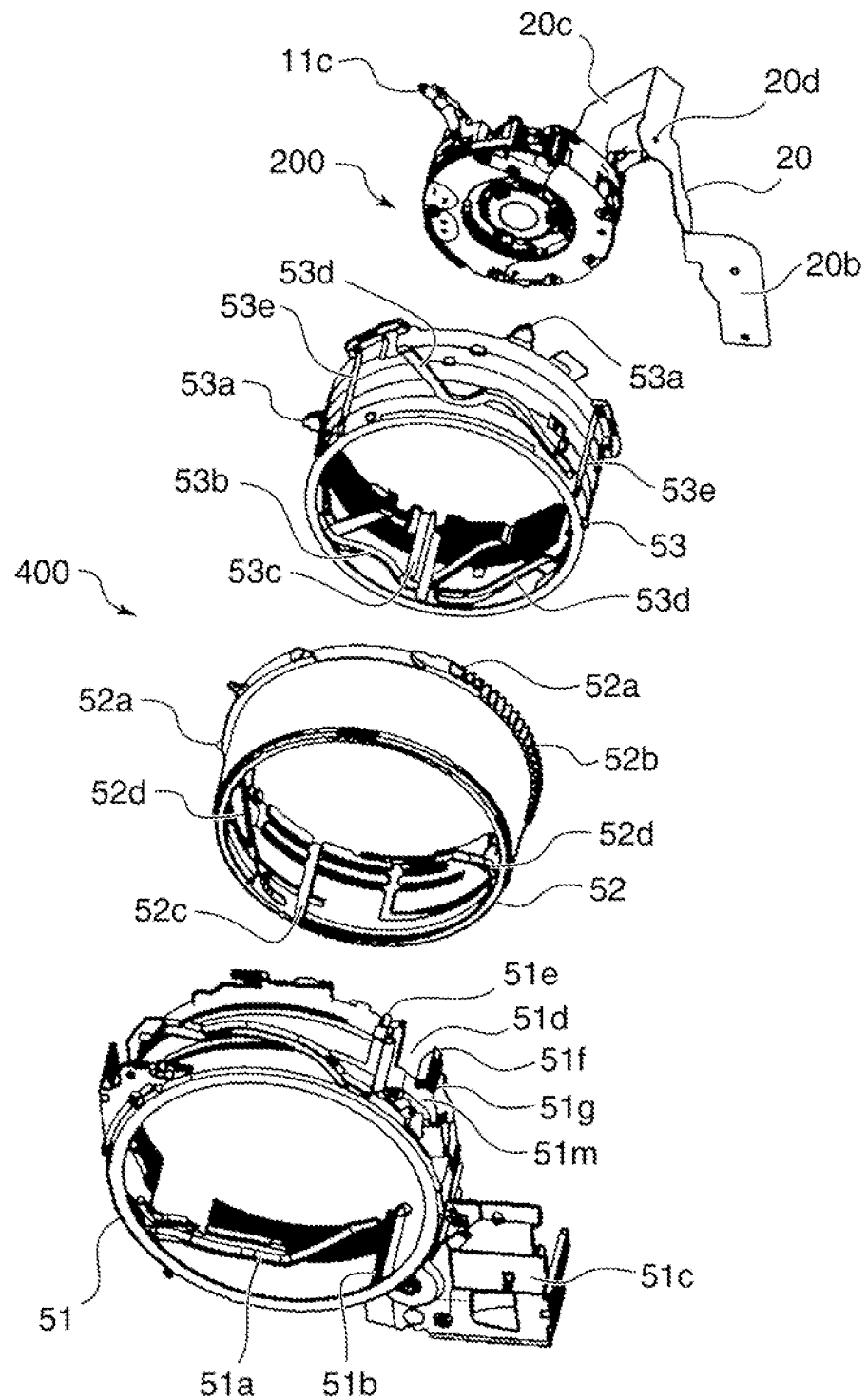
FIG. 5 is an exploded perspective view showing a second group unit side half of a barrel unit of the lens barrel.

The shutter base plate 11 is formed at its central part with an opening 11a, and formed at its outer periphery with three cam followers 11b respectively engaged with three cam grooves 52d of a second cam barrel 52 (see FIG. 5).

The shutter blade 12 is formed with a hole 12a and a non-illustrated elongated hole, and the shutter blade 13 is formed with a hole 13a and an elongated hole 13b. The shutter blade 12 is rotatably supported at the hole 12a by the shutter base plate 11 through the intermediate sheet 14, and coupled at the elongated hole 12b with the shutter and ND driving unit 17. The shutter blade 13 is rotatably supported at the hole 13a by the shutter base plate 11 through the intermediate sheet 14, and coupled at the elongated hole 13b with the shutter and ND driving unit 17.

The intermediate sheet 14 is formed at its central part with an opening 14a through which object light enters. The ND blade 15 is formed with a hole 15a and an elongated hole 15b, is rotatably supported at the hole 15a by the shutter base plate 11 through the blade presser 16, and is coupled at the elongated hole 15b with the shutter and ND driving unit 17. The blade presser 16 is supported by the shutter base plate 11.

The shutter and ND driving unit 17 and the image stabilization driving unit 18 are disposed in front of the shutter base plate 11 so as to surround the opening 11a of the shutter base plate 11. The shutter and ND driving unit 17 causes the shutter blades 12, 13 and the ND blade 15 to open and close. The image stabilization driving unit 18 minutely moves the second group lens unit 19 in a direction perpendicular to the optical axis so as to avoid handshake blur.

The second group lens unit 19 includes a lens holding frame 19a and a photographing optical system 21 for variable magnification, and is supported between the shutter base plate 11 and the shutter and ND driving unit 17 and between the shutter base plate 11 and the image stabilization driving unit 18 so as to be movable in a direction perpendicular to the optical axis.

The shutter flexible circuit board 20 is disposed in front of the shutter and ND driving unit 17 and the image stabilization driving unit 18. The shutter flexible circuit board 20 includes a ring-shaped connection portion 20a that is connected to the shutter and ND driving unit 17 and to the image stabilization driving unit 18, a connection portion 20b that is connected to the connection portion 8c of the lens barrel flexible circuit board 8, and a coupling portion 20c that connects the connection portions 20a, 20b together. The coupling portion 20c is disposed along the optical axis direction, and formed with a hole 20d fitted with the fixed shaft 51g of the fixed barrel 51 (see FIG. 5). The connection portions 20a, 20b are an example of first and second connection portions of this invention.

Figure 4:
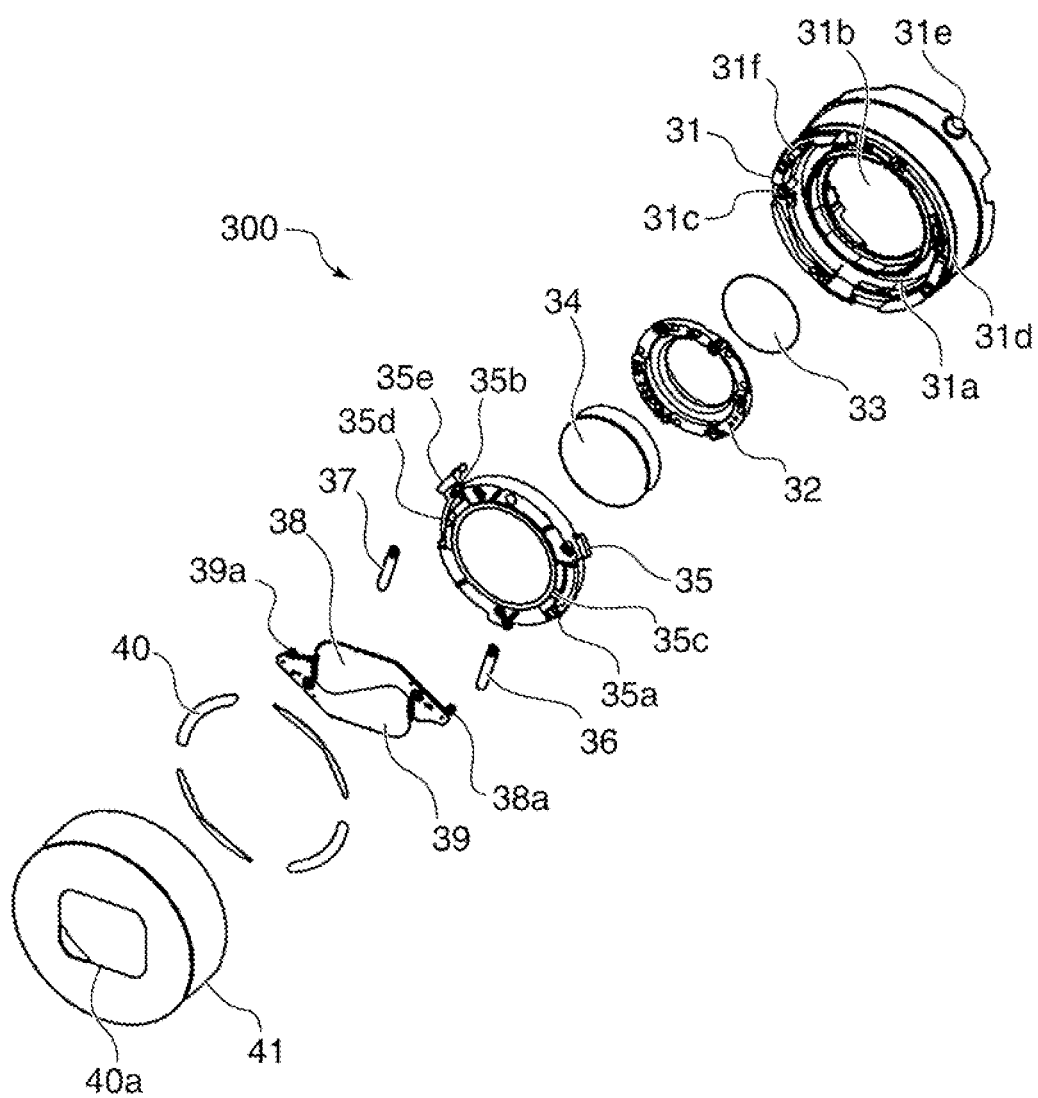
FIG. 4 is an exploded perspective view showing a first group unit of the lens barrel.

FIG. 4 shows the first group unit 300 in exploded perspective view.

As shown in FIG. 4, the first group unit 300 includes a first group barrel 31, lens holding frame 32, photographing optical systems 33, 34 for variable magnification, barrier driving ring 35, springs 36, 37, barrier blades 38, 39, and barrier cover 41.

The first group barrel 31 is formed with a flange portion 31a and a hole 31f, and the flange portion 31a is formed at its central part with an opening 31b. Support holes 31c, 31d that support the barrier blades 38, 39 are formed on the first group barrel 31 at locations outward of the opening 31b, and three cam followers 31e for engagement with three cam grooves 54c of the first cam barrel 54 (see FIG. 6) are formed on the outer periphery of the first group barrel 31.

The lens holding frame 32 that supports the photographing optical systems 33, 34 for variable magnification is supported at the opening 31b by the first group barrel 31.

The barrier driving ring 35 is rotatably supported by the first group barrel 31 at locations outward of the opening 31b of the barrel 31, and when rotating, causes the barrier blades 38, 39 to open and close. The barrier driving ring 35 has hooks 35a, 35b formed thereon that are hooked with respective ones of springs 36, 37, and has drive portions 35c, 35d formed thereon that respectively drive the barrier blades 38, 39. Furthermore, the barrier driving ring 35 has an interlocking portion 35e that is formed on an outer periphery of the ring 35 so as to pass through the hole 31f of the first group barrel 31 and that operates in conjunction with a first rectilinear barrel 55 (see FIG. 6) when the lens barrel 700 is being retracted.

The springs 36, 37 are disposed between the barrier driving ring 35 and the barrier blades 38, 39. The springs 36, 37 have respective one ends hooked to the hooks 35a, 35b of the barrier driving ring 35 and respective other ends hooked to non-illustrated hooks of the barrier blades 38, 39, and urge the barrier blades 38, 39 in opening directions.

The barrier blades 38, 39 are disposed between the barrier driving ring 35 and the barrier cover 41, and have shafts 38a, 39a formed thereon that are rotatably supported in the support holes 31c, 31d of the first group barrel 31. The barrier blades 38, 39 rotate about the shafts 38a, 39a to open and close an opening 41a formed in a central part of the barrier cover 41 that is fixed to the first group barrel 31 with a fixing tape 40.

Figure 6:
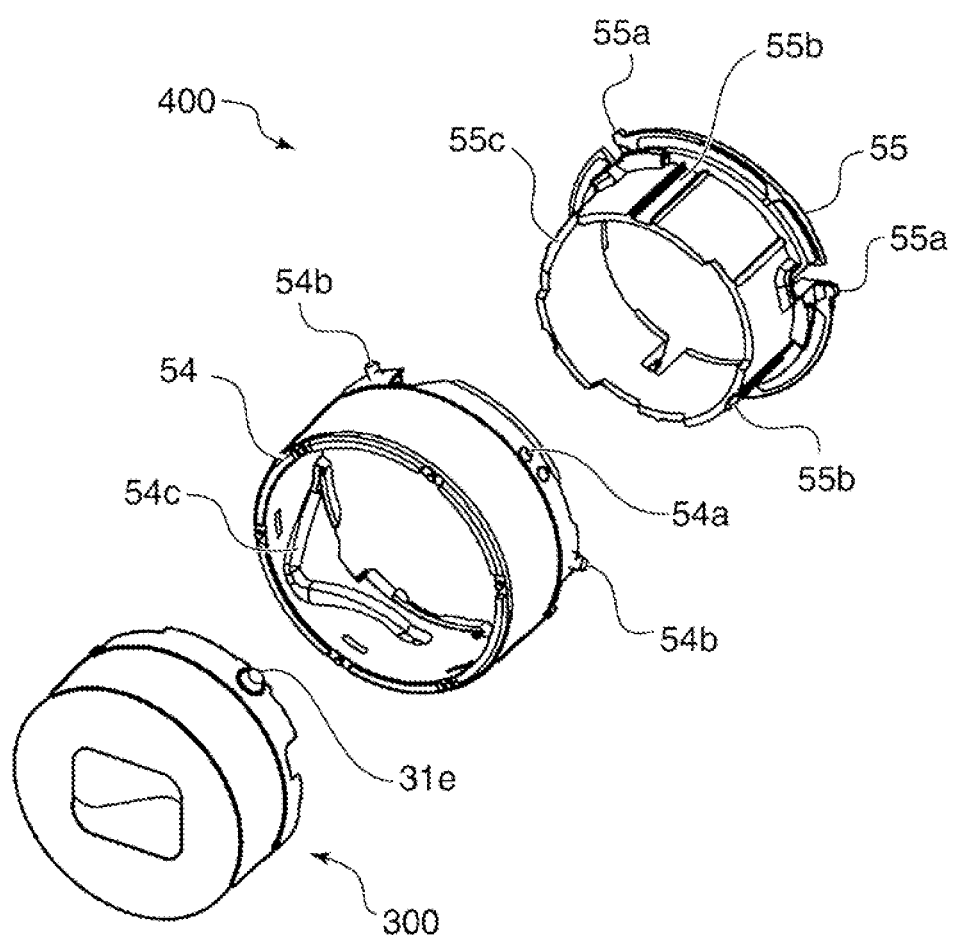
FIG. 6 is an exploded perspective view of a first group unit side half of the barrel unit.

FIGS. 5 and 6 respectively show a second group unit side half and a first group unit side half of the barrel unit 400 in exploded perspective view.

As shown in FIGS. 5 and 6, the barrel unit 400 includes the fixed barrel 51, first and second cam barrels 54, 52, and first and second rectilinear barrels 55, 53.

The fixed barrel 51 has three cam grooves 51a and three rectilinear grooves 51b formed on its inner periphery, has a hold portion 51c provided on its outer periphery that holds the zoom reduction gear unit 500, and has a notch portion 51d formed therein through which the connection portion 20b and the coupling portion 20c of the shutter flexible circuit board 20 are inserted.

The notch portion 51d is formed to extend from an image face side peripheral edge of the fixed barrel 51 toward the object side (i.e., in the optical axis direction) and to have a width greater than a width of the coupling portion 20c of the shutter flexible circuit board 20 as viewed in the circumferential direction of the fixed barrel 51. The connection portion 20b and the coupling portion 20c of the shutter flexible circuit board 20 are inserted through the notch portion 51d and led out to the outside of the fixed barrel 51.

On the outer peripheral face of the fixed barrel 51, a wall portion 51m is formed around the notch portion 51d so as to project outward in the diametrical direction of the fixed barrel 51. More specifically, the wall portion 51m extends along one side edge of the notch portion 51d as viewed in the circumferential direction of the fixed barrel 51, extends in the circumferential direction of the fixed barrel 51 along an object side edge of the notch portion 51d, and extends along another side edge of the notch portion 51d as viewed in the circumferential direction of the fixed barrel 51. When the lens barrel 700 is in a retracted state, a housing space 51k (see FIGS. 12 and 13) in which the coupling portion 20c of the shutter flexible circuit board 20 is housed is defined by the wall portion 51m of the fixed barrel 51 and the movement preventing portion 1f of the support base plate 1 of the focus unit 100.

As previously described, the wall portion 51m has the fixed shaft 51g fitted into the hole 20d of the shutter flexible circuit board 20. The fixed shaft 51g is formed at its root with a detachment preventing portion 51h (see FIG. 13) having D-cut faces and being smaller in diameter than a tip end portion of the fixed shaft 51g. By fitting the fixed shaft 51g into the hole 20d, the shutter flexible circuit board 20 is fixed in position.

The fixed barrel 51 has positioning shafts 51e, 51f formed thereon at opposite sides of the notch portion 51d as viewed in the circumferential direction of the fixed barrel 51. The positioning shafts 51e, 51f are fitted into non-illustrated holes of the support base plate 1 of the focus unit 100.

The second cam barrel 52 has three cam followers 52a formed on its outer periphery that are respectively engaged with three cam grooves 51a of the fixed barrel 51. By the engagement between the cam followers 52a and the cam grooves 51a, the second cam barrel 52 is supported so as to be rotatable relative to the fixed barrel 51. The cam barrel 52 can move forward and rearward in the optical axis direction, while rotating, in cam lift sections of the cam grooves 51a.

The second cam barrel 52 has a gear 52b formed on its outer periphery that meshes with a reduction gear 64 (see FIG. 7) of the zoom reduction gear unit 500. On an inner periphery of the second cam barrel 52, there are formed three rectilinear grooves 52c with which three driving pins 54b of the first cam barrel 54 are engaged and three cam grooves 52d with which three cam followers 11b of the shutter base plate 11 of the second group unit 200 are engaged. By the engagement between the cam grooves 52d and the cam followers 11b, the second group unit 200 can move forward and rearward in the optical axis direction in cam lift sections of the cam grooves 52d.

The second rectilinear barrel 53 is disposed on an inner periphery side of the second cam barrel 52, and has three protrusions 53a formed on its outer peripheral face that are respectively engaged with three rectilinear grooves 51b of the fixed barrel 51. By the engagement between the protrusions 53a and the rectilinear grooves 51b, the second rectilinear barrel 53 can move forward and rearward in the optical axis direction in unison with the second cam barrel 52, while being prevented from rotating.

The second rectilinear barrel 53 has three cam grooves 53b and three rectilinear grooves 53c formed on its inner peripheral face, and has three cam holes 53d formed therein through which the three driving pins 54b of the first cam barrel 54 respectively extend, and three rectilinear holes 53e formed therein with which three cam followers 11b of the shutter base plate 11 of the second group unit 200 are respectively engaged. By the engagement between the cam followers 11b and the rectilinear holes 53e, the second group unit 200 is prevented from rotating.

The first cam barrel 54 is formed at its outer periphery with three cam followers 54a that are respectively engaged with three cam grooves 53b of the second rectilinear barrel 53. By the engagement between the cam followers 54a and the cam grooves 53b, the first cam barrel 54 is supported for rotation relative to the second rectilinear barrel 53 and, while rotating, can move forward and rearward in the optical axis direction in cam lift sections of the cam grooves 53b.

The first cam barrel 54 has three driving pins 54b formed on its outer periphery that respectively extend through three cam holes 53d of the second rectilinear barrel 53 and that are respectively engaged with three rectilinear groove 52c of the second cam barrel 52. By the engagement between the driving pins 54b and the rectilinear grooves 52c, rotation of the second cam barrel 52 is conveyed to the first cam barrel 54.

The first cam barrel 54 is formed at its inner periphery with three cam grooves 54c with which three cam followers 31e of the first group barrel 31 of the first group unit 300 are respectively engaged. By the engagement between the cam grooves 54c and the cam followers 31e, the first group unit 300 is supported for forward and rearward movement in the optical axis direction in cam lift sections of the cam grooves 54c.

The first rectilinear barrel 55 is disposed on an inner periphery side of the first cam barrel 54, and has three protrusions 55a formed on its outer periphery that are respectively engaged with three rectilinear grooves 53c of the second rectilinear barrel 53. The first rectilinear barrel 55 can move forward and rearward in the optical axis direction in unison with the first cam barrel 54, while being prevented from rotating by the engagement between the protrusions 55a and the rectilinear grooves 53c.

The first rectilinear barrel 55 has three rectilinear holes 55b formed on its outer periphery with which three non-illustrated protrusions of the first group barrel 31 of the first group unit 300 are respectively engaged. By the engagement between the rectilinear holes 55b and the protrusions of the first group barrel 31, the first group unit 300 is prevented from rotating. The first rectilinear barrel 55 is formed at its tip end portion with cam portions 55c that drive the barrier driving ring 35 of the first group unit 300 when the lens barrel 700 is being retracted.

FIG. 7 shows the zoom reduction gear unit 500 in exploded perspective view.

As shown in FIG. 7, the zoom reduction gear unit 500 includes the aforementioned zoom motor 61, which serves as a driving unit, and reduction gears 62 to 64.

As previously described, the zoom motor 61 has the connection terminal 61a connected with the connection portion 8b (FIG. 2) of the lens barrel flexible circuit board 8, and is fixed to the support portion 1h of the support base plate 1. The reduction gear 62 is press-fitted to a motor shaft of the zoom motor 61 for rotation in unison therewith. As previously described, the reduction gears 63, 64 are supported by the support portion 1k of the support base plate 1.

The reduction gear 62 meshes with the reduction gear 63 that meshes with the reduction gear 64. As previously described, the reduction gear 64 meshes with the gear 52b of the second cam barrel 52. By the meshing between the reduction gear 64 and the gear 52b, rotation of the zoom motor 61 is conveyed to the second cam barrel 52.

Figure 8:
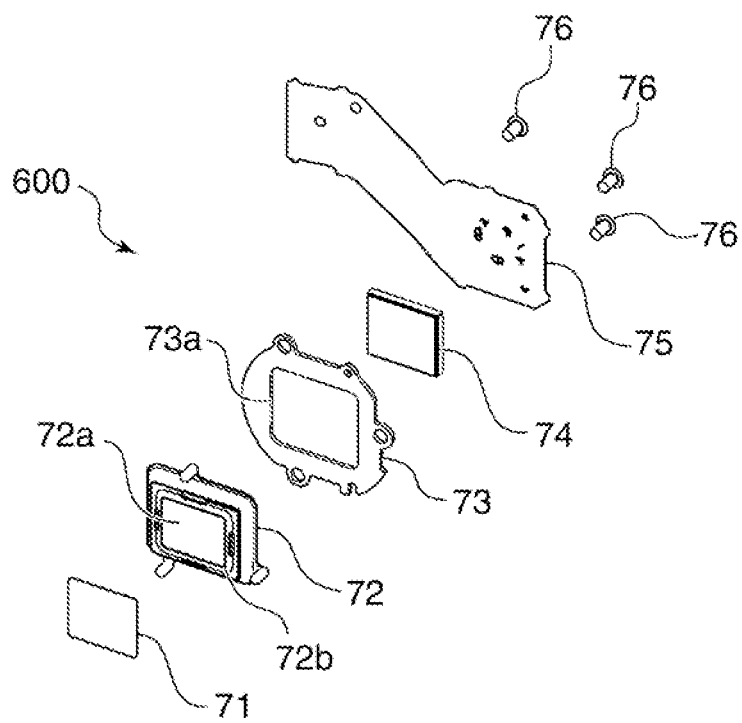
FIG. 8 is an exploded perspective view showing an imaging device unit of the lens barrel.

FIG. 8 shows the imaging device unit 600 in exploded perspective view.

As shown in FIG. 8, the imaging device unit 600 includes an optical filter 71, dust-proof rubber 72, fixture plate 73, imaging device 74, and imaging device flexible circuit board 75.

The optical filter 71 is disposed behind the support base plate 1 of the focus unit 100, and mounted to the support base plate 1 through the dust-proof rubber 72. The dust-proof rubber 72 has an opening 72a formed at its central part and a pressing portion 72b formed around the opening 72 that presses the optical filter 71 in the optical axis direction. The fixture plate 73 has an opening 73a formed at its central part and is fixed to the support base plate 1 by screws 76.

The imaging device 74 photoelectrically converts an optical image of an object formed on the imaging device 74 through the photographing optical systems 33, 34, 21, and 3. The imaging device 74 is disposed inside the opening 73a of the fixture plate 73 and fixed to the fixture plate 73 by e.g. adhesive.

The imaging device flexible circuit board 75 is electrically connected with the imaging device 74. An image signal obtained by photoelectric conversion in the imaging device 74 is supplied through the imaging device flexible circuit board 75 to a non-illustrated image processing circuit of the camera main unit.

In the following, with reference to FIGS. 9 to 13, a description will be given of a method for assembling the shutter flexible circuit board 20 of the second group unit 200 to the fixed barrel 51 of the barrel unit 400 and for assembling the barrel unit 400 to the support base plate 1 of the focus unit 100.

Figure 9:
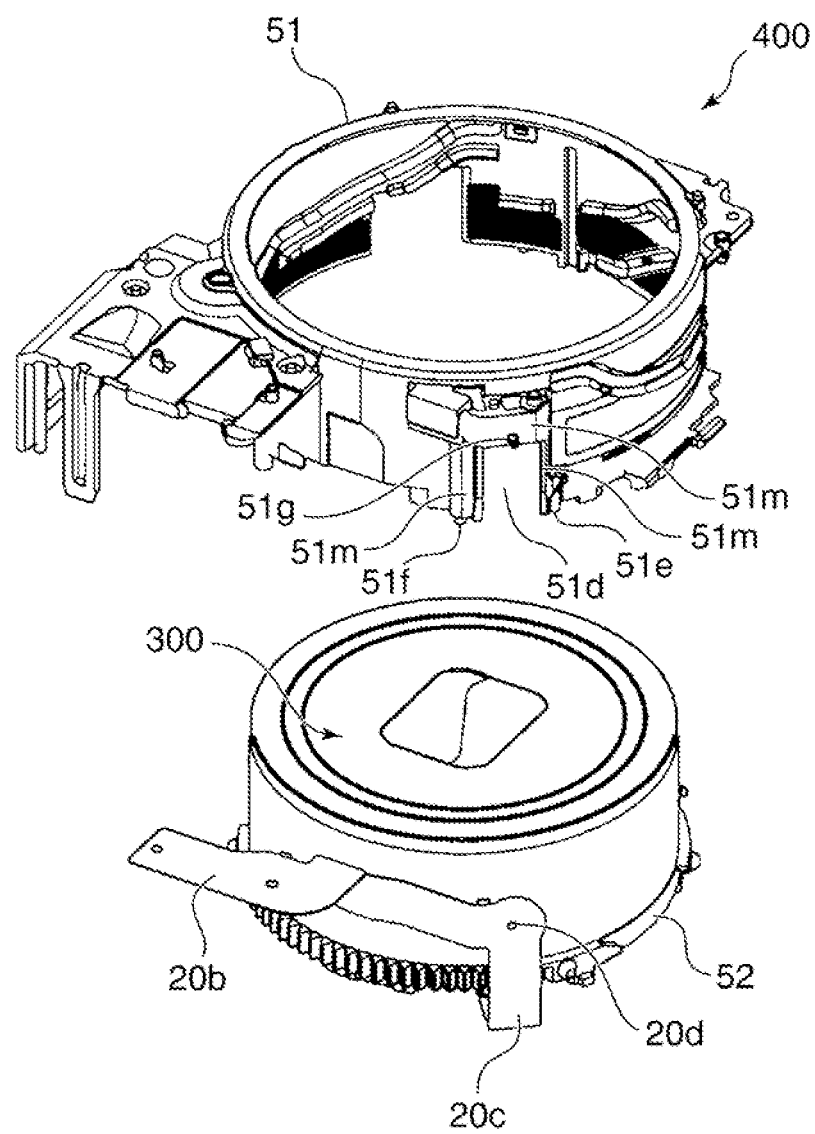
FIG. 9 is an exploded perspective view showing a state observed before the first group unit assembled with the second group unit is assembled to the barrel unit.
Figure 10:
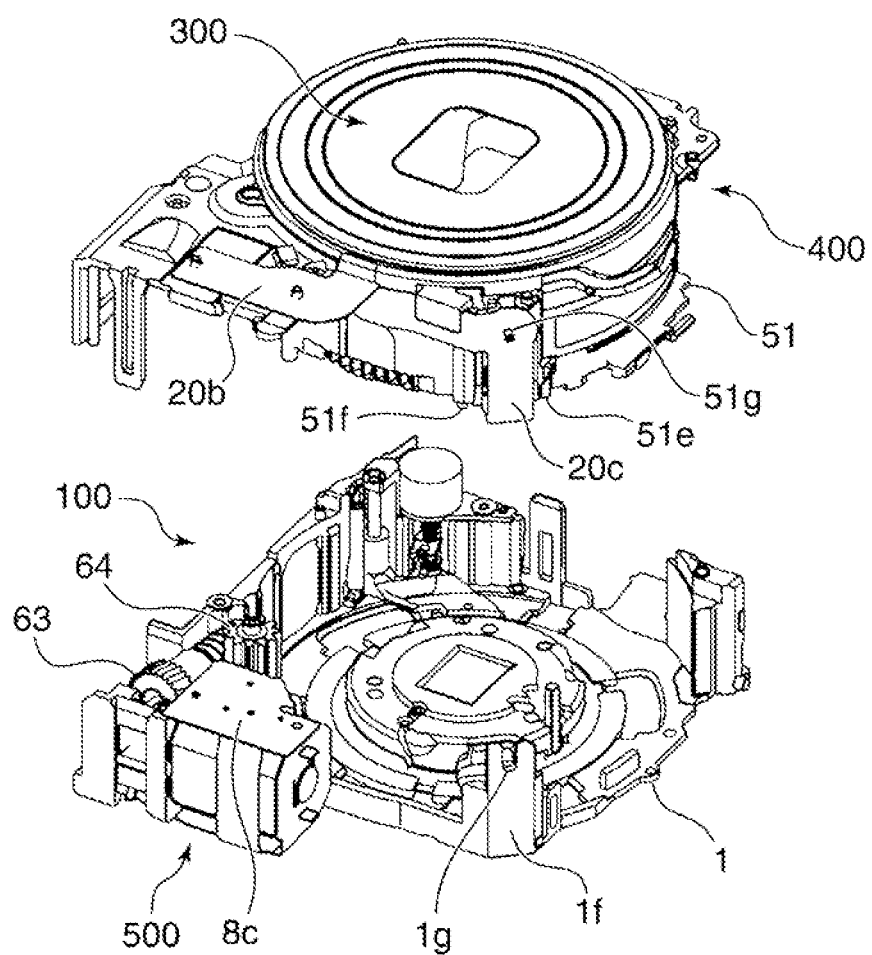
FIG. 10 is an exploded perspective view showing a state observed before the barrel unit assembled with the first and second group units is assembled to the focus unit.
Figure 11:
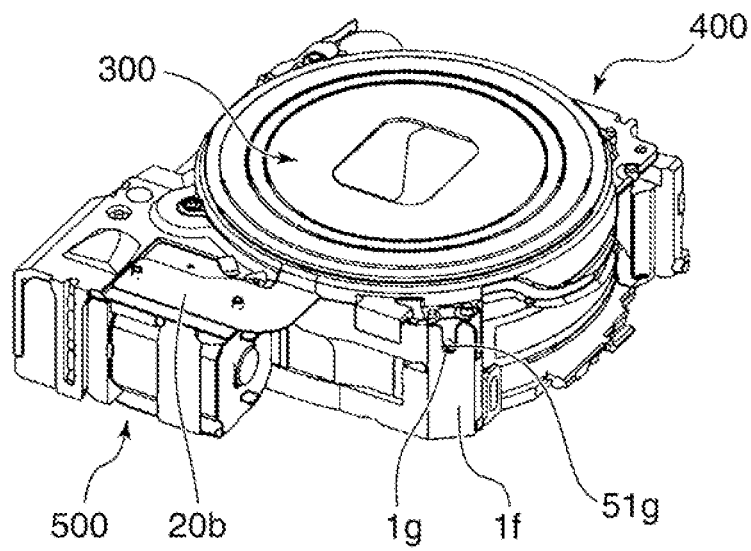
FIG. 11 is a perspective view showing a state where the barrel unit assembled with the first and second group units is assembled to the focus unit.
Figure 12:
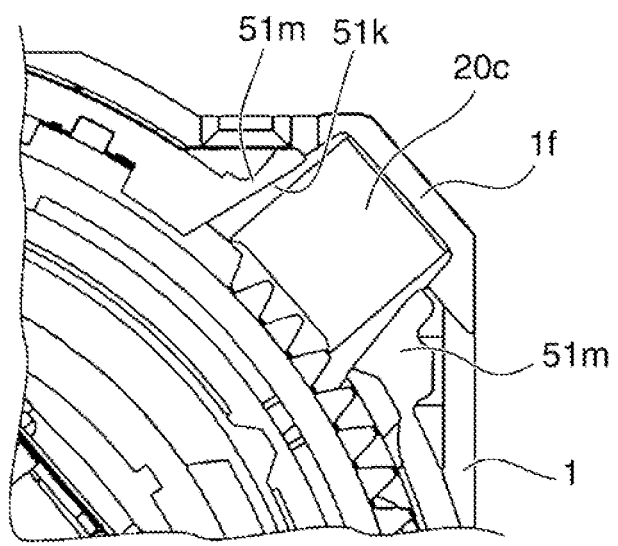
FIG. 12 is a fragmentary view showing in section a housing space in which a coupling portion of a shutter flexible circuit board of the lens barrel is housed.
Figure 13:
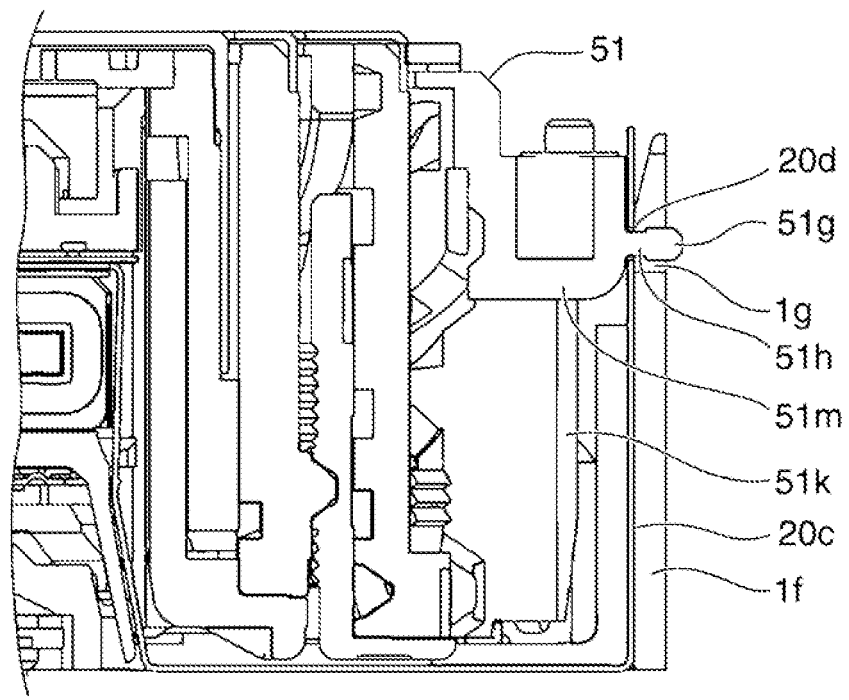
FIG. 13 is a fragmentary view showing in vertical section a state where the coupling portion of the shutter flexible circuit board of the lens barrel, which is in a retracted state, is housed in the housing space.

FIG. 9 shows in exploded perspective view a state observed before the first group unit 300 assembled with the second group unit 200 is assembled to the barrel unit 400. FIG. 10 shows in exploded perspective view a state observed before the barrel unit 400 assembled with the first and second group units 300, 200 is assembled to the focus unit 100, and FIG. 11 shows in perspective view a state where the barrel unit 400 is assembled to the focus unit 100. FIG. 12 shows in section and in fragmentary view a housing space in which the coupling portion 20c of the shutter flexible circuit board 20 is housed. FIG. 13 shows in vertical section and in fragmentary view a state where the coupling portion 20c of the shutter flexible circuit board 20 of the lens barrel 700, which is in a retracted state, is housed in the housing space.

In the state shown in FIG. 9, the second group unit 200 has been assembled to the first group unit 300, and the connection portion 20b and the coupling portion 20c of the shutter flexible circuit board 20 of the second group unit 200 have been drawn out to the outside of the first group unit 300.

To assemble the shutter flexible circuit board 20 of the second group unit 200 to the fixed barrel 51 of the barrel unit 400 from the state shown in FIG. 9, the first group unit 300 (FIG. 9) assembled with the second group unit 200 is assembled to the barrel unit 400, and the connection portion 20b and the coupling portion 20c of the shutter flexible circuit board 20 are inserted through the notch portion 51d of the fixed barrel 51 and drawn out through the notch portion 51d to the outer periphery of the fixed barrel 51. Next, as shown in FIG. 13, the hole 20d formed in the coupling portion 20c of the shutter flexible circuit board 20 is fitted onto the fixed shaft 51g of the fixed barrel 51, whereby the detachment preventing portion 51h of the fixed shaft 51g is fitted into the hole 20d of the coupling portion 20c.

As a result, the shutter flexible circuit board 20 of the second group unit 200 assembled to the first group unit 300 is assembled and fixed to the fixed barrel 51 of the barrel unit 400 and the connection portion 20b and the coupling portion 20c of the board 20 are disposed on the outer periphery of the barrel unit 400, as shown in an upper half of the FIG. 10.

Next, from the state shown in the upper half of FIG. 10, the barrel unit 400 assembled with the shutter flexible circuit board 20 of the second group unit 200 is assembled to the support base plate 1 of the focus unit 100.

To this end, the coupling portion 20c of the shutter flexible circuit board 20 is extended along the inside face of the movement preventing portion 1f of the support base plate 1 in the optical axis direction. Next, the positioning shafts 51e, 51f of the fixed barrel 51 of the barrel unit 400 are fitted into respective ones of non-illustrated holes of the support base plate 1.

Then, the notch portion 51d (FIG. 9) of the fixed barrel 51 through which the coupling portion 20c of the board 20 has been inserted is covered by the movement preventing portion 1f of the support base plate 1 as shown in FIG. 11, and the coupling portion 20c of the board 20 is housed in the housing space 51k, which is defined by the movement preventing portion 1f and the wall 51m of the fixed barrel 51, as shown in FIGS. 12 and 13. Next, the fixed shaft 51g of the fixed barrel 51 is inserted into the hole 1g formed in the movement preventing portion 1f (see FIG. 11), whereby the coupling portion 20c of the flexible circuit board 20 is pressed against the wall 51m of the fixed barrel 51 by the movement preventing portion 1f of the support base plate 1.

The assembling of the barrel unit 400, which has been assembled with the shutter flexible circuit board 20, to the support base plate 1 of the focus unit 100 can be performed as described above.

Next, with reference to FIGS. 13 to 15, a description will be given of a state where the shutter flexible circuit board 20 of the lens barrel 700, which is in a forwardly moved state, is housed in the housing space.

Figure 14:
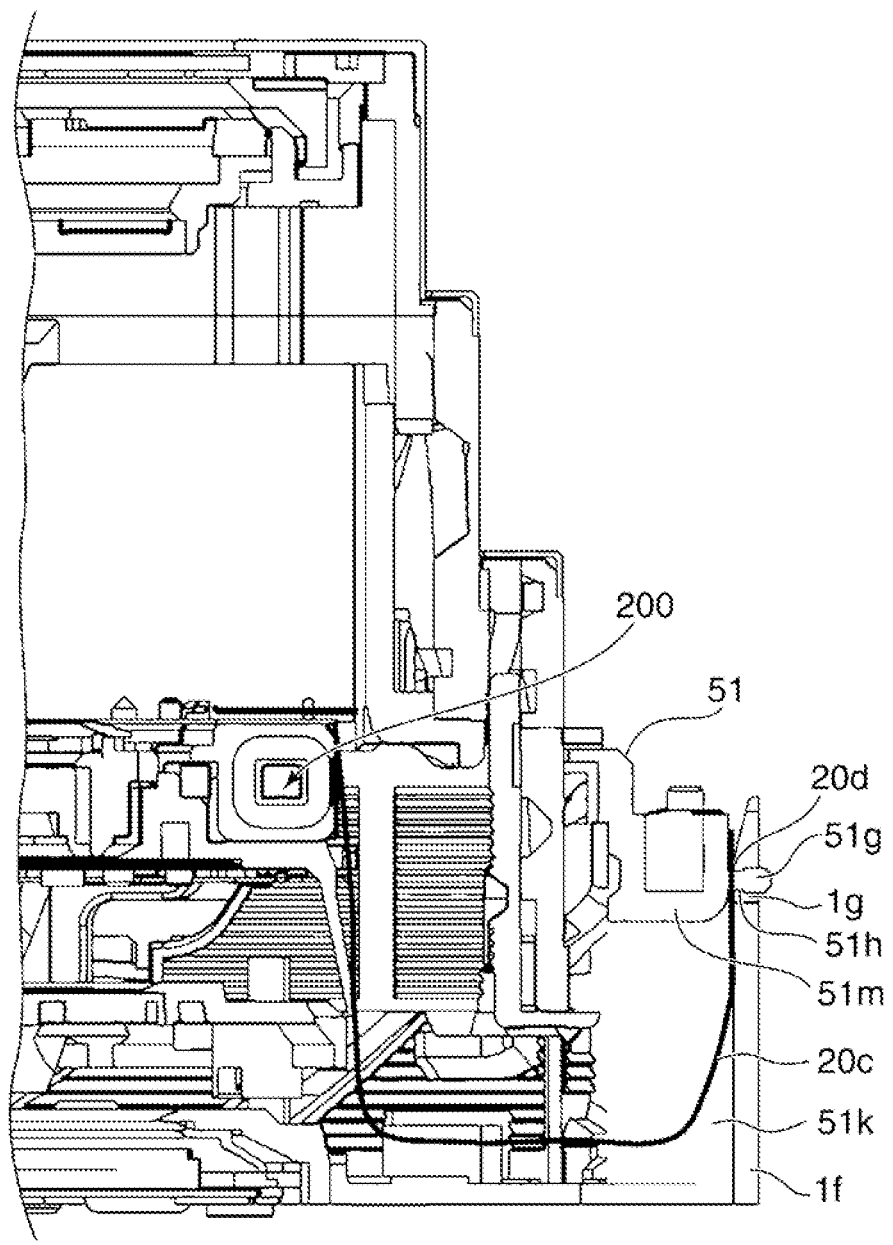
FIG. 14 is a fragmentary view showing in vertical section a state where the coupling portion of the shutter flexible circuit board of the lens barrel, which is in a WIDE state, is housed in the housing space.
Figure 15:
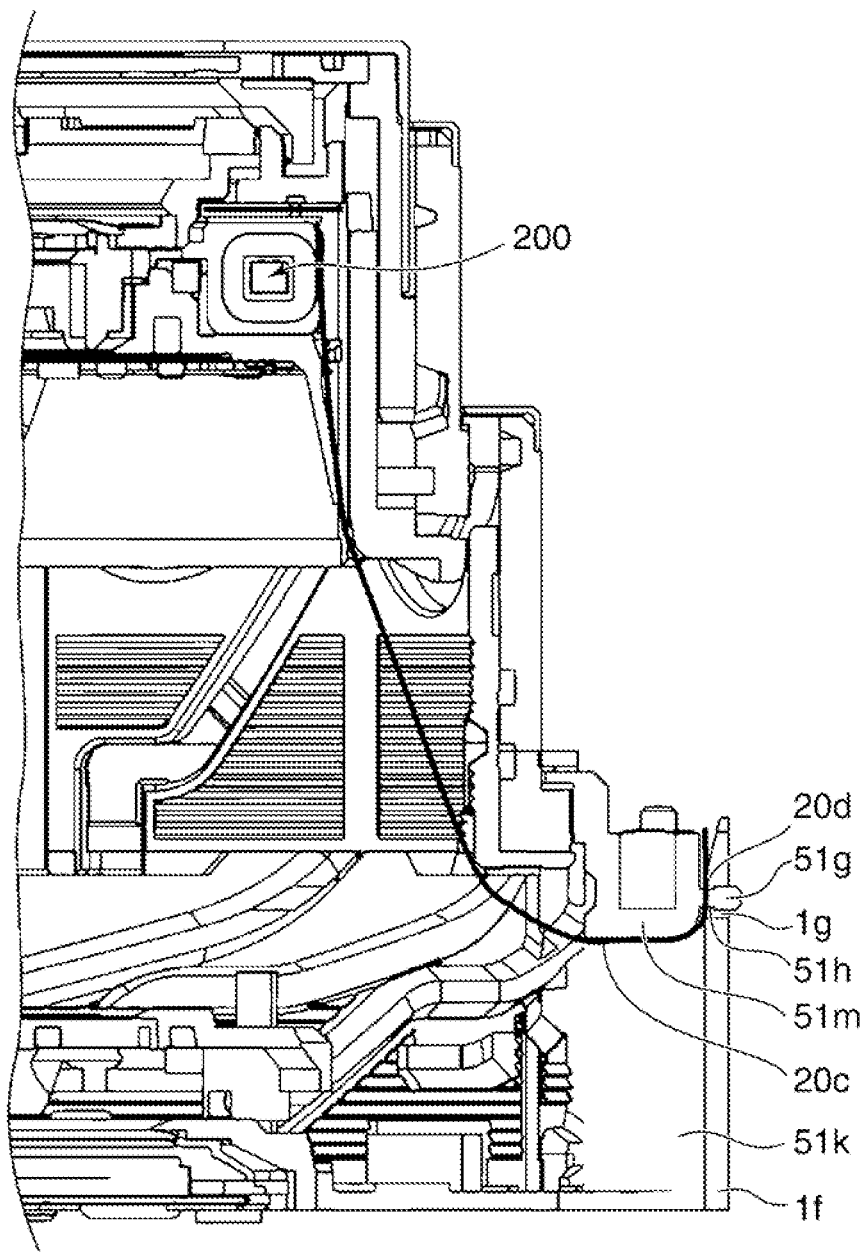
FIG. 15 is a fragmentary view showing in vertical section a state where the coupling portion of the shutter flexible circuit board of the lens barrel, which is in a TELE state, is housed in the housing space.

FIGS. 14 and 15 show, in vertical section and in fragmentary view, states where the coupling portion 20c of the shutter flexible circuit board 20 of the lens barrel 700, which is in a WIDE state and in a TELE state, respectively, is housed in the housing space.

When the second group unit 200 is moved from the retracted state shown in FIG. 13 to a WIDE position shown in FIG. 14, the coupling portion 20c of the shutter flexible circuit board 20 moves inside the housing space 51k. In a case that the second group unit 200 has moved to a TELE position as shown in FIG. 15, the coupling portion 20c of the flexible circuit board 20 is in abutment with a face of the wall portion 51m on a side close to the housing space 51k.

As described above, according to this embodiment, the connection portion 20b and the coupling portion 20c of the shutter flexible circuit board 20 of the second group unit 200 assembled to the first group unit 300 are inserted through the notch portion 51d of the fixed barrel 51 of the barrel unit 400, whereby the shutter flexible circuit board 20 can be assembled to the fixed barrel 51 in a state that the connection portion 20b and the coupling portion 20c of the flexible circuit board 20 are exposed to the outside of the fixed barrel 51.

As a result, the workability in assemblage can be improved since it becomes unnecessary to forwardly move the lens barrel and insert the shutter flexible circuit board through the through hole of the fixed barrel, unlike the assemblage of the prior art lens barrel unit in which the connection member of the shutter flexible circuit board is inserted through the through hole of the fixed barrel and connected to the lens barrel flexible circuit board.

With this embodiment, it is possible to reliably hold the shutter flexible circuit board 20 by pressing the coupling portion 20c of the flexible circuit board 20 against the wall 51m of the fixed barrel 51 by the movement preventing portion if by inserting the fixed shaft 51g of the fixed barrel 51 of the barrel unit 400 into the hole 1g formed in the movement preventing portion 1f of the support base plate 1 of the focus unit 100.

Accordingly, even if the connection portion 20b and the coupling portion 20c of the shutter flexible circuit board 20 are bent immediately after being inserted through the notch portion 51d of the fixed barrel 51, a force acting to press the shutter flexible circuit board 20 into inside the lens barrel is not applied to the board 20, unlike the conventional case. It is therefore possible to prevent ghost or flare from being caused by reflection of light passing through the photographing optical system by the shutter flexible circuit board 20, and to prevent wire disconnection from being caused by the flexible circuit board 20 being pinched between component parts inside the lens barrel when the lens barrel is brought into a retracted state.

While the present invention has been described with reference to an exemplary embodiment, it is to be understood that the invention is not limited to the disclosed exemplary embodiment. The scope of the following claims is to be accorded the broadest interpretation so as to encompass all such modifications and equivalent structures and functions.

This application claims the benefit of Japanese Patent Application No. 2012-018346, filed Jan. 31, 2012 which is hereby incorporated by reference herein in its entirety.

What is claimed is:

1. A lens barrel comprising:
a fixed barrel configured to support first and second lens barrels so as to be movable in an optical axis direction, said second lens barrel having a shutter driving unit;
a shutter flexible circuit board having a first connection portion configured to be connected to the shutter driving unit and a second connection portion configured to be connected to the first connection portion through a coupling portion; and
a support member configured to support said fixed barrel and a driving unit for driving the first and second lens barrels,
wherein said fixed barrel has a notch portion formed thereon through which the coupling portion of said shutter flexible circuit board is inserted, and has a fixed shaft formed thereon to project outward in a diametrical direction and to be fitted into a hole formed in the coupling portion of said shutter flexible circuit board, and
said support member has a movement preventing portion formed thereon configured to prevent the coupling portion of said shutter flexible circuit board whose hole is fitted with the fixed shaft of said fixed barrel from moving outward in the diametrical direction of said fixed barrel.

2. The lens barrel according to claim 1, wherein the movement preventing portion is formed with a hole into which the fixed shaft is inserted.

3. The lens barrel according to claim 1, wherein said fixed barrel has a wall portion formed on an outer peripheral face thereof around the notch portion so as to extend outward in the diametrical direction of said fixed barrel, and a housing space for said shutter flexible circuit board is defined by the wall portion and the movement preventing portion.

4. The lens barrel according to claim 3, wherein the wall portion is formed on an object side of the notch portion, and the fixed shaft is formed on the wall portion.

5. An image pickup apparatus comprising the lens barrel as set forth in claim 1.

6. A lens barrel comprising:

a fixed barrel configured to support a movable barrel so as to be movable in an optical axis direction, the movable barrel having an optical driving unit;

a flexible circuit board configured to be connected to the optical driving unit; and a support member configured to support the fixed barrel, wherein the fixed barrel has a notch portion and a fixed portion which are formed thereon, wherein the flexible circuit board is led out to the outside of the fixed barrel through the notch portion, wherein a part of the flexible circuit board led out through the notch portion is fixed at the fixed portion, wherein the support member has a movement preventing portion formed thereon, and wherein the movement preventing portion prevents the part of the flexible circuit board led out through the notch portion from moving outward in a diametrical direction of the fixed barrel.

7. The lens barrel according to claim 6, wherein the fixed portion is formed by a fixed shaft which is projected outward in the diametrical direction, wherein the fixed shaft is fitted into a hole formed in the flexible circuit board, and wherein the movement preventing portion has a cut out portion into which the fixed shaft is inserted.

8. The lens barrel according to claim 6, wherein the fixed barrel has a wall portion formed on an outer peripheral face thereof around the notch portion so as to extend outward in the diametrical direction of the fixed barrel, and wherein a housing space for the flexible circuit board is defined by the wall portion and the movement preventing portion.

9. The lens barrel according to claim 8, wherein the wall portion is formed on an object side of the notch portion, and the fixed portion is formed on the wall portion.

10. An image pickup apparatus comprising the lens barrel as set forth in claim 6.

\* \* \* \* \*